(No Model.) 2 Sheets—Sheet 1.

J. KLAR & F. H. HALL.
ANIMAL TRAP.

No. 540,991. Patented June 11, 1895.

WITNESSES:
J. A. Bergstrom
C. Sedgwick

INVENTORS
J. Klar
F. H. Hall
BY Munn & Co.
ATTORNEYS.

(No Model.) 2 Sheets—Sheet 2.

J. KLAR & F. H. HALL.
ANIMAL TRAP.

No. 540,991. Patented June 11, 1895.

WITNESSES:
J. A. Bergstrom
C. Sedgwick

INVENTORS
J. Klar
F. H. Hall
BY Munn & Co.
ATTORNEYS.

United States Patent Office.

JOSEPH KLAR AND FRANK H. HALL, OF ANNA, ILLINOIS.

ANIMAL-TRAP.

SPECIFICATION forming part of Letters Patent No. 540,991, dated June 11, 1895.

Application filed September 6, 1894. Serial No. 522,298. (No model.)

*To all whom it may concern:*

Be it known that we, JOSEPH KLAR and FRANK H. HALL, of Anna, in the county of Union and State of Illinois, have invented a new and Improved Animal-Trap, of which the following is a full, clear, and exact description.

Our invention relates to an improvement in traps, especially to that class of traps adapted to catch rats and mice, and it has for its object to improve upon and simplify the construction of the trap for which Letters Patent were granted to us on June 14, 1892, No. 477,126.

The especial feature of the improvement consists in providing safeguards or locks of simple form, which will effectually prevent the animal when entrapped from leaving the compartment of the trap into which it may have entered, and likewise to provide a trap of economic construction, and one in which the parts will operate automatically.

The invention consists in the novel construction and combination of the several parts, which will be hereinafter fully described and pointed out in the claims.

Reference is to be had to the accompanying drawings, forming a part of this specification, in which similar letters and figures of reference indicate corresponding parts in all the views.

Figures 1, 2:
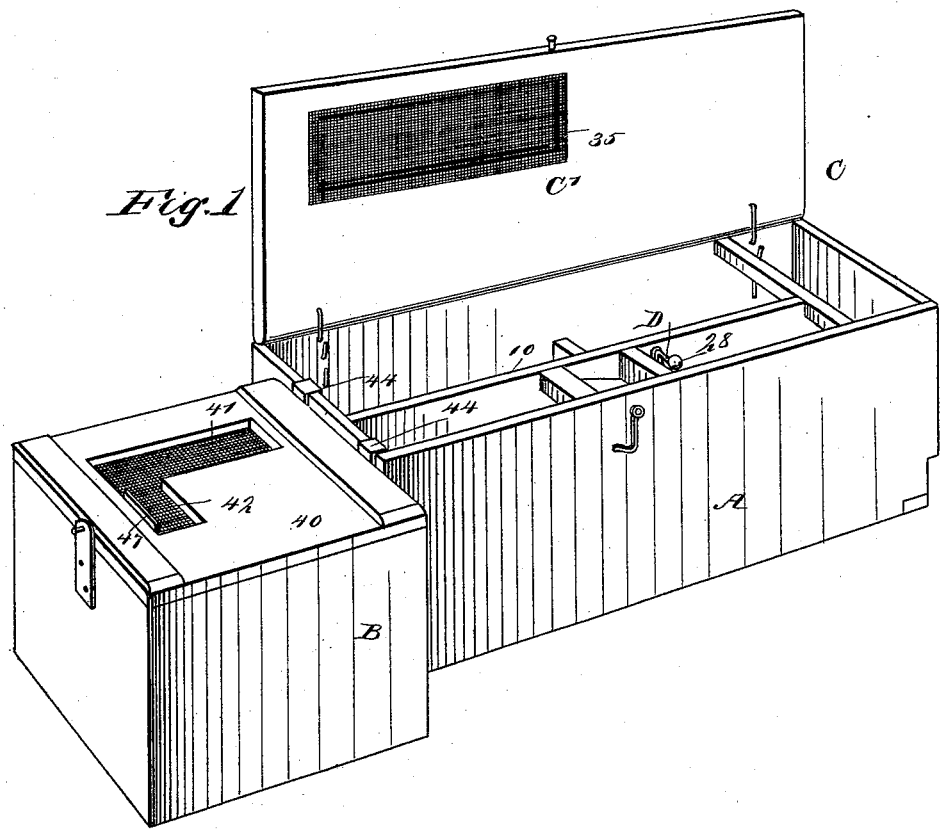
Figure 3:
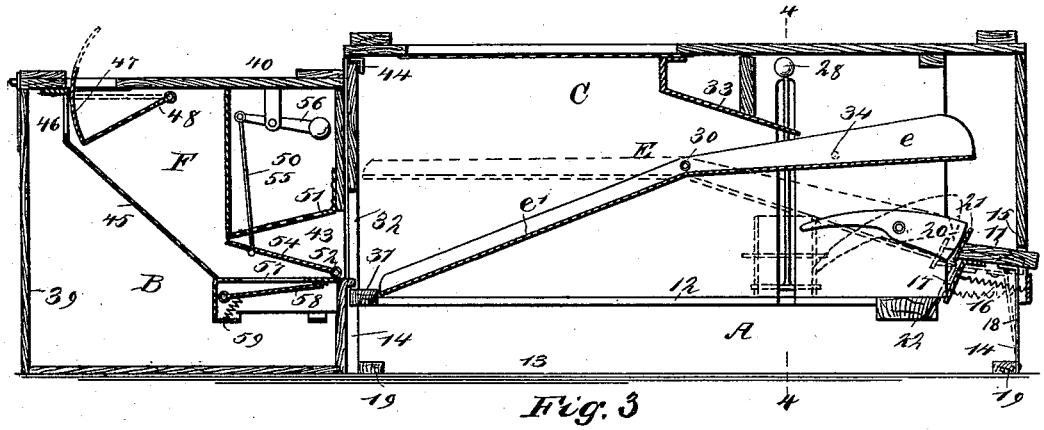
Figures 4, 5:
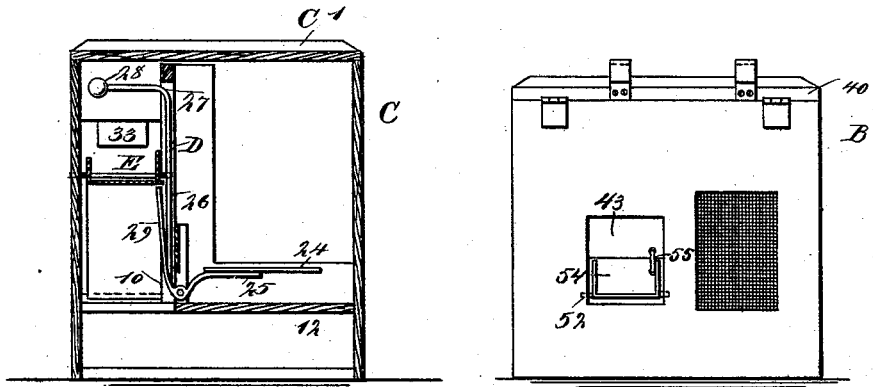
Figure 7:
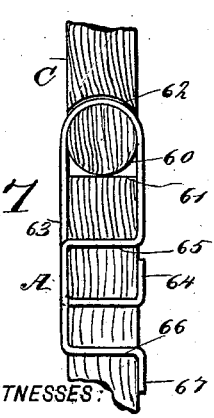
Figure 6:
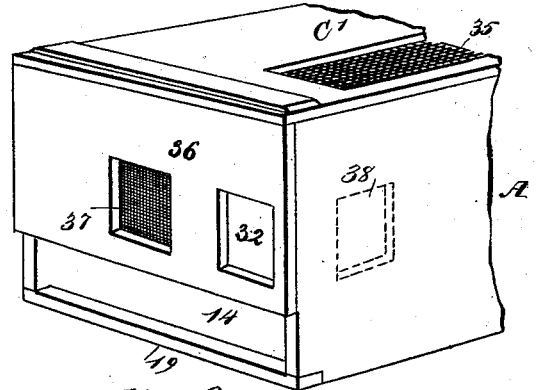

Figure 1 is a perspective view of the trap. Fig. 2 is a plan view thereof with the top removed. Fig. 3 is a longitudinal section through the trap, taken practically on the line 3 3 of Fig. 2. Fig. 4 is a transverse section through the body portion of the trap, taken essentially on the line 4 4 of Fig. 3. Fig. 5 is a front elevation or inner face view of the receiving-section of the trap. Fig. 6 is a rear elevation or outer face view of the body-section of the trap; and Fig. 7 is a section taken vertically through the lid and body of the trap, illustrating the manner in which the hinge is formed.

The trap comprises two sections, a body section A, in which the animal is entrapped, and a receiving section B in which the animal is to be imprisoned, and into which the animal will wander, being guided in that direction.

The body section A, which is the main portion of the trap, contains a casing C, of box-like construction, and ordinarily this section is made of greater length than width and is provided with a lid or cover C', hinged to the body by an especial form of hinge to be described later on. The casing of the body section is provided with a longitudinal partition 10, which is located parallel with one side, ordinarily the front side, and is much nearer that side than the back side. The upper edge of the partition is practically flush with the upper edge of the casing. The partition abuts against the rear end of the casing, but stops short of the forward end, and a sufficient space intervenes the forward end of the partition and the forward end of the casing to admit of the location of a locking platform 11 therein.

The bottom 12 of the casing is located above the lower edge of the body section A so that quite a space 13, is afforded between the surface on which the body section may be placed and the bottom of the casing. The bottom of the casing extends from end to end thereof, and terminates at its junction with the partition 10. An opening 14, is made in each end of the body section, and the said openings lead into the space below the bottom of the casing C.

The locking platform 11 extends out through an opening 15 in the forward end of the body section A, and has sliding movement in the said opening, being normally held in an inner position by means of a spring 16, attached to said section, as shown in Fig. 3, and to a projection 17 from the inner end of the platform. The platform is mainly supported through the medium of a standard or standards 18, which are attached firmly to the under face of the platform, and are also loosely connected to a cross bar 19, extending across the bottom portion of the casing as is also shown in Fig. 3, whereby said platform 11 and its standard or standards 18 are permitted to rock from the position seen in full lines in Fig. 3 to that seen in dotted lines. The platform is held in its outer position, the spring at that time being under tension, through the medium of a brake lever 20, which is fulcrumed upon the partition, the outer end of the lever being of greater weight than the inner end and consequently the outer end of the lever will gravitate downward, and will engage with a projection 21, formed upon the inner face of the platform, and when this engagement is made the platform is held in a rigid position and at its maximum extension through its guide slot 15. The brake lever 20, is preferably curved upon its upper face.

When the brake lever 20, is released from the platform 11, the spring will throw the platform inward, and at the same time it will drop downward, to the position indicated in dotted lines in Fig. 3, said platform being guided in its downward movement by the projection 17 to which the spring is attached, operating against the beveled face of a short cross bar 22, which spans the space between the forward lower end of the partition 10 and adjacent side of the body. This cross bar 22, forms a step upon which the animal mounts after having entered the space beneath the body of the trap through either of the end openings 14; and from the cross bar 22 the animal may step upon the platform 11, which is normally held, as heretofore stated in rigid position by the brake lever. The platform is provided with an extension at its inner side edge, said extension being designated as 23, and is shown best in Fig. 2; and from this extension the animal may readily step upon the bottom of the casing.

A bait platform 24, is located over the bottom of the casing, and the said bait platform, as shown in Fig. 4, is secured to the horizontal member 25 of an angled lever 26, the vertical member of which lever is carried upward in a slot 27, made in the partition 10, and at its upper end is carried over the space between the front of the casing and the partition, terminating in a weight 28. The lever comprising the members 25 and 26 may be called a trip lever, and for convenience in referring to it hereinafter is designated by the reference letter D. The lower end of the lever is fulcrumed above the forward end of the bottom of the casing, as illustrated in Fig. 4 and the lever is provided with an arm 29, which extends upwardly and in direction of the front of the casing, the said arm being a portion of the vertical member of the lever.

The arm 29, is adapted as a support for the forward end of a chute or run-way E. The chute or run-way is preferably made of metal, and is substantially U-shaped in cross section. The chute or run-way is bent upon itself at a point near the center, providing a forward straight section e and a rear downwardly inclined section e'; and where the two sections connect, the pivot 30 of the chute is located. The chute is placed between the partition and the forward side of the casing, its location being such that when the forward member is in a horizontal position it is elevated some distance above the lower edge of the partition, while the rear or inner end of the rear section e', will rest upon or engage with a ledge 31, located upon the inner face of the rear or inner end portion of the casing; and immediately over this ledge a door way 32, is constructed.

In order to prevent the animal when traveling upon the chute from going back to the starting point, a barrier 23, is located over the section e, the said barrier being placed preferably over the pivot point of the chute, and it extends downwardly and in direction of the forward end of the casing to a point just above the sides of the forward section of the chute when the latter is in its normal or elevated position. The chute is held in this position, as has heretofore been stated, by the arm 29 of the trip lever, the arm being located beneath the chute, as shown in Fig. 4; and when the arm is removed from engagement with the chute, the forward section of the chute being heavier than the rear section will drop downward to an alignment with the locking platform 11, thereby elevating the rear section, as shown in dotted lines in Fig. 3.

When the forward or weighted end of the chute drops, a stud 34, located upon one side of the said weighted section of the chute, will strike the rear end of the brake lever 20 and throw its outer or weighted end upward out of engagement with the locking platform 11, and therefore about the time that the forward end of the chute presses upon the cross bar 22 of the casing, the platform 11 will have been released and will have been drawn or pressed inward by its spring 16, and the inner end of the platform will rest upon the outer surface of the forward or outer end of the chute, thus locking the chute with its forward end in an inclined position. Thus in the operation of the body of the trap, the rat or mouse after entering it and stepping upon the platform 11 will pass into the interior chamber and will approach the bait platform 24. When an attempt is made to take the bait from the platform 24, the arm 29 of the trip lever D will be carried from beneath the forward end of the chute, and the said end will drop downward and be locked by the platform 11 in its lower position. The animal becoming frightened, will attempt to escape by the way it entered, but will be prevented by the lower position of the front end of the chute and the platform 11. Therefore the animal will take the only exit offered and will ascend the chute. After passing the pivot point of the chute, the weight of the animal will cause the inner end to drop downward and the outer end to ascend to its normal position, and in ascending the forward end of the chute will throw upward the platform 11, which will be immediately locked by engagement with the trip lever 20. Thus the animal when passing down the chute sets the chute in position to permit the trap to receive another victim, while the animal which is passing down the chute cannot possibly return, owing to the barrier 33 above the chute. After the animal passes down the chute it may pass out through the door way 32 into a pen, a box, or any receptacle placed to receive the animal. Preferably in connection with the body portion of the trap, however, a receiving section B, is employed, constructed as shown in the drawings.

The cover C' of the body section is provided with an opening covered by a netting 35, and the said netting is so located that it will be over the inner end of the chute when the cover is closed; and the light penetrating through the net-covered opening will entice the animal down the chute.

An opening 36, is made in the inner end of the box, covered by a netting 37; and the said opening is adapted to permit the animal, when located in the body of the box, to observe others in the prison or receiving section.

In Fig. 6 we have illustrated an opening 38 in dotted lines in the side of the body. Such an opening may be provided when the receiving receptacle is to be placed at the side instead of at the end of the box. The receiving section of the box consists of a casing 39 of box-like construction, normally covered by a lid 40, which lid, as shown in Fig. 1, is provided with an opening 41, covered by a wire netting 42, or its equivalent, for the purpose of admitting air into the casing.

What may be termed the forward end of the receiving section is provided with a door way 43, adapted to register with the door way 32 in the body of the trap, the receiving receptacle and the body being held in connection by means of any approved form of clamp, hooks 44, being used for that purpose as shown in the drawings. Within the casing of the receiving section of the trap a box F, is located, said box being secured to the under surface of the lid 40; and the box comprises two sides, which are inclined at their rear lower edges, and are connected at said edges by a screen 45. The upper rear end of the box is provided with an opening 46, normally closed by a gate 47, which has guided movement in the screen portion of the cover 40, the said gate being attached to a plate 48, provided with a screen panel 49, which plate is pivotally connected to the sides of the box near its upper end. The screen plate 48, when it is pressed upward to the position shown in dotted lines, will carry the gate 47 away from the exit opening 46, and will admit of an animal passing through the opening. Immediately after such an exit has been made, the gate will drop downward to the lower position shown in positive lines, which will prevent any animal passing into the box through the said opening 46.

A compartment 50, is formed in the forward end of the box, the bottom of which compartment consists of a screen 51, and this screen occupies an inclined position in front of the door-way 32 of the body section of the trap; and the bottom of the box is on a level practically with the lower sill of the door-way in the body section.

The animal after passing through the doorway 32 of the trap, will enter the box F through its opening 43, and in making such an entrance it will tread upon a door 54, pivoted at 52 upon the floor of the box at the opening 43; and this door is normally held in an upwardly inclined position and practically to an engagement with the inner end of the base wall of the compartment 50 by a link 55, which is carried up through the bottom of the compartment 50, as shown in Fig. 3, and is attached to one end of a lever 56, fulcrumed in said compartment, the opposite end of which lever is weighted. Thus the animal when reaching the pivoted door 54 will be encouraged to pass over the same by reason of the light shining through the screen bottom of the compartment 50. The door 54, will fall to an engagement with the bottom of the box under the weight of the animal and the animal will then find itself upon passing the door upon the bottom screen 45 of the box, and the door 54 will be immediately carried upward by the weighted lever, and the animal will be prevented from returning in the manner in which the entrance was made.

The animal upon finding itself upon the screen 45 of the box will either ascend the screen, the light shining through the screen plate 48, and will press that plate upward, carrying the gate 47 from the exit opening 46 of the box, and by jumping through this opening the animal will reach the main chamber of the receiving section of the trap; or the animal instead of ascending the screen may pass out in a shorter way through an opening 57 made in the bottom of the box F, and immediately beneath the hinged door 54. Thus when the hinged door passes upward to close the entrance, should the animal endeavor to push up the door, it will fall through the opening 57 upon a second hinged door 58, located beneath the opening and held normally in position to close it by a spring 59, and the door will give way the weight of the animal overcoming the spring 59, and consequently the animal will fall to the bottom of the main compartment, the door 58 will be immediately thrown upward by its spring 59, and the opening 57, will be closed from the exterior of the box.

In the forward end of the receiving section of the trap another opening is preferably made in addition to the opening 43, the second opening being a grated one, and it registers with the screened opening 36 in the body of the trap.

The hinged connection between the cover C' of the body of the trap and the said body is effected in the manner shown in Fig. 7, and a hinge exceedingly simple yet durable and efficient is obtained. The edge of the cover that is to have the hinged connection with the edge of the body of the box is made cylindrical, as shown at 60 in the said Fig. 7, while the receiving edge 61 of the box body is flat. A wire is passed through a curved channel 62 made in the cover a suitable distance above its cylindrical edge. The curve of the opening or channel 62 together with the curve of the surface 60, constitutes substantially a circle. After the wire is passed through the channel 62 in the cover it is carried downward along one side of the body, as shown at 63 and through the body to the opposite side, where the end of the wire is upturned in engagement with said side, as shown at 64. The other end of the wire is carried downward along the face of the body opposite to that engaged by the stretch 63. It is then carried through the body, as shown at 65 to the opposite side and down the opposite side, then again through the body as shown at 66, to the side with which it was first brought in engagement, and its second end is then bent downward against the body, as illustrated at 67, both of the ends therefore being clinched upon the same side of the body. In this manner the hinge is made of a single stretch of wire, and the hinge is both simple and durable and is likewise economic. This construction, although possessing many advantages for use, is not essential to our invention, and we do not lay claim to it. We may employ any other form of hinge as well.

We desire it to be understood that if found desirable in practice, the doorway 32 of the trap may be arranged at any desired point in the side instead of at the end of the body section A, and the receiving section B located opposite said doorway; and that the bait platform 24 may be worked by a spring instead of operating by its own weight.

Having thus described our invention, we claim as new and desire to secure by Letters Patent—

1. In an animal trap of the character described, a pivoted chute or runway, and a barrier located over the chute, and adapted to close the passage along the same when the chute is tilted permitting said chute to be traveled over from end to end in one direction only, substantially as and for the purpose specified.

2. In an animal trap, a pivoted chute or runway, a locking platform located near one end of the chute, said platform being capable of a reciprocating movement, and a lock lever normally in engagement with the platform and adapted to be tripped by the chute, as and for the purpose specified.

3. In a trap, the combination, with a chute or runway pivoted between its ends, and a trip lever provided with a supporting arm adapted for engagement with the chute, of a bait platform connected with the trip lever, a locking platform capable of reciprocating movement and located near one end of the chute, and a lock lever adapted to engage with the locking platform and to be tripped by the chute in its downward movement, as and for the purpose specified.

4. In a trap, the combination, with a chute or runway pivoted between its ends, and having one end heavier than the other, a weighted trip lever provided with an arm adapted to uphold the heavier end of the chute, and a bait platform connected with the trip lever, of a barrier located above the pivot portion of the chute, permitting the chute to be traveled over from end to end in one direction only, a spring-controlled locking platform capable of a reciprocating movement and located adjacent to an entrance to the trap and adjacent to the heavier end of the chute, and a brake lever normally in engagement with the locking platform and adapted to be tripped by the chute in one of its downward movements, as and for the purpose specified.

5. The combination, with a trap, of a receiving section in communication therewith, the said receiving section being provided with an interior box lighted from the top and lighted from the bottom and provided with an entrance opening in its forward end, an exit opening in its rear end and in its bottom portion, a gate adapted to close the end exit opening and to be lifted from said opening by an animal within the box, a pivoted door located in an inclined position at the threshold of the entrance opening of the box, a balance lever connected with the door, and a lighted partition located above the door and over the entrance opening, and a spring-controlled door opening in an opposite direction to the entrance door and located beneath the exit opening in the bottom of the box, all combined for operation substantially as herein shown and described.

6. In an animal trap, a pivoted chute or runway, adapted to be tilted when traveled over by the animal, means for returning said runway to its normal position after the animal has passed over the same, a barrier over the runway adapted when the runway is tilted to close the passage along the same and a locking device actuated by the movement of the runway for holding the same in its normal position, substantially as set forth.

7. In an animal trap, a pivoted chute or runway adapted to be tilted when traveled over by the animal, means for returning said runway to its normal position when the animal has passed over the same, a barrier over the runway adapted when the runway is tilted to close the passage along the same a movable bait-platform, and means actuated by the movement of said bait platform for locking and unlocking the runway, substantially as set forth.

JOSEPH KLAR.
FRANK H. HALL.

Witnesses:
WILL W. SETTLEMOIR,
S. H. LETEINGER.